United States Patent
Wang

(10) Patent No.: US 9,966,057 B1
(45) Date of Patent: May 8, 2018

(54) METHODS AND SYSTEMS FOR ENGINE SOUND DURING IDLE-STOP

(71) Applicant: Ford Global Technologies, LLC, Dearborn, MI (US)

(72) Inventor: Yan Wang, Ann Arbor, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days. days.

(21) Appl. No.: 15/593,060

(22) Filed: May 11, 2017

(51) Int. Cl.
G10K 11/16 (2006.01)
G10K 11/178 (2006.01)
F02N 11/08 (2006.01)

(52) U.S. Cl.
CPC ........ *G10K 11/178* (2013.01); *F02N 11/0814* (2013.01); *G10K 2210/1282* (2013.01); *G10K 2210/3016* (2013.01)

(58) Field of Classification Search
CPC ..................................................... G10K 11/16
See application file for complete search history.

(56) References Cited

U.S. PATENT DOCUMENTS

| | | | |
|---|---|---|---|
| 8,474,308 B2 | 7/2013 | Sgatti et al. | |
| 9,347,388 B2 * | 5/2016 | Bohn | F02N 11/0814 |
| 9,478,214 B2 | 10/2016 | Orth | |
| 2009/0277707 A1 | 11/2009 | Ballard | |
| 2010/0245069 A1 * | 9/2010 | Noro | B60Q 5/008 340/441 |
| 2011/0044470 A1 * | 2/2011 | Ogata | B60R 21/34 381/86 |
| 2015/0020762 A1 * | 1/2015 | Peitz | H04R 1/00 123/184.53 |
| 2017/0043713 A1 * | 2/2017 | Sun | B60Q 5/00 |
| 2017/0123754 A1 * | 5/2017 | Kwon | G06F 3/165 |

FOREIGN PATENT DOCUMENTS

| | | |
|---|---|---|
| EP | 1462777 A1 | 9/2004 |
| JP | H05011788 A | 1/1993 |
| JP | 2000316201 A | 11/2000 |
| JP | 2009292337 A | 12/2009 |

* cited by examiner

*Primary Examiner* — Olisa Anwah
(74) *Attorney, Agent, or Firm* — Julia Voutyras; McCoy Russell LLP

(57) ABSTRACT

Methods and systems are provided for adjusting an engine sound audible to the operator in a vehicle cabin during an engine idle-stop. In one example, responsive to an engine idle-stop, modified versions of a generated engine sound may be played via a dashboard speaker during each of the engine spin-down, engine rest, and engine spin-up. The modified versions of a generated engine sound may at least partially cancel inherent engine spin-up and engine spin-down sounds while maintaining an engine idling sound.

18 Claims, 4 Drawing Sheets

METHODS AND SYSTEMS FOR ENGINE SOUND DURING IDLE-STOP

FIELD

The present description relates generally to methods and systems for adjusting perceivable engine sound during engine idle-stops.

BACKGROUND/SUMMARY

During intermediate vehicle stops such as at a traffic light, an engine may idle for some time. In order to increase fuel efficiency and improve emissions quality, the vehicle engine may be equipped with a start-stop function to reduce prolonged idling by temporarily shutting down the engine and then restarting the engine when restart conditions are met. As the engine is shut down and then subsequently restarted, there may be changes in engine sound during engine spin-down, engine rest, and the engine spin-up. Such perceivable changes in engine sound may be objectionable to the operator, at least because the operator may be expecting a different sound.

Various approaches are provided for suppressing changes in engine sound during engine start-stop operations. In one example, as shown in U.S. Pat. No. 9,347,388, Bohn et al. teaches, playing a predetermined and/or customizable sound through a vehicle audio system during the period that the engine is stopped. The background sound may mask changes in engine noise during engine stop and subsequent engine restart. The volume of the background sound may be increased prior to engine restart to blend the background sound with the sound of the engine start.

However, the inventors herein have recognized potential issues with such systems. As one example, any perceivable change in engine sound during the start-stop operation of the engine may be objectionable to the operator. As another example, increasing the volume of the background noise may not be able to seamlessly mask the sound of the engine shutdown or restart. In particular, during engine spin-down, the engine sounds audible to the operator may vary until the engine has completely stopped spinning. Similar variations in the audible sound may occur immediately after engine restart until a target speed is reached. Such variations may not be effectively masked by playing a background noise whose volume is adjusted. Engine start-stop operations may be frequently used during city drive and such recurring changes in engine sound may degrade the operator's driving experience.

In one example, the issues described above may be addressed by a method comprising: during an idle-stop, generating, through an electronic speaker, an engine sound responsive to an automatic engine stop during each of an engine spin-down and while the engine is subsequently at rest, including commencing at least partial active engine noise cancellation upon the spin-down and ending said cancellation upon reaching stabilized idle in a subsequent restart. In this way, by selectively modifying a recorded engine sound and playing modified versions of the recorded sound during an engine idle-stop and a subsequent engine restart, perceivable changes in engine sound during engine idle-stops may be reduced.

As one example, in response to idle-stop conditions being met (such as in response to a longer than threshold duration of engine idling), an engine idle-stop may be initiated and engine combustion may be suspended. During the idle-stop, a modified version of a recorded or a modelled sound may be played via a dashboard speaker. If the engine idling speed immediately prior to suspension of combustion is lower than a threshold speed, the engine sound audible to the vehicle operator may be recorded using a microphone located in the dashboard of the vehicle and uploaded to a database of the vehicle controller. The database may include recordings of engine sound made at different engine speeds and engine temperatures. Upon suspension of combustion, an inherent engine spin-down sound may be modelled based on the idling speed immediately prior to suspension of combustion. Once the combustion is suspended, engine sound recorded immediately before the idle-stop or an engine sound recording retrieved from the database may be played via a speaker in the dashboard of the vehicle. During engine spin-down, the phase and amplitude of the waveform of the recorded engine sound may be adjusted to cancel the inherent engine spin-down sound and produce an overall residual sound that mimics the engine idling sound prior to suspension of combustion. An unmodified version of the recorded sound may be played during the time that the engine is at rest. Upon a subsequent engine restart, the waveform of the recorded engine sound may be modified to cancel the inherent engine spin-up sound and to maintain an engine idling sound. For example, during the engine restart, the phase of the waveform of the recorded engine may be synchronized with the phase of the inherent engine spin-up sound so that the recorded sound may be gradually phased out by the time the engine speed reaches the target idling speed. Responsive to a higher than threshold torque demand, at restart, playing of the recorded sound may be discontinued at the end of the engine spin-up phase.

In this way, during an engine idle-stop and subsequent restart, by cancelling the inherent engine spin-up and engine spin-down sounds and playing an engine idling sound, changes in engine sound during engine start-stop operations may not be perceived by the operator. In particular, the operator may perceive a continuous engine idling sound during the start-stop operation, even as the inherent engine sound changes. By recording engine sound using a dashboard microphone, immediately prior to engine shut-down, and by playing back a suitably modified version of the recorded sound during engine idle-stop, there may not be any significant difference in the quality of engine sound as audible to the vehicle operator. The technical effect of aligning the phase of a modified recorded sound played during engine spin-up with the phase of an inherent engine spin-up sound is that the same engine sound may be continued until the engine is restarted. By gradually phasing out the recorded engine sound upon engine restart, any abrupt change in engine sound may be unperceivable to the operator. In this way, the overall drive experience of the operator during engine start-stop operations is improved.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

The following description relates to systems and methods for generating engine sound, during engine idle-stop operations. A dashboard microphone and speaker, as shown in the vehicle system of FIG. 1, may be used for recording and/or playing an engine sound during engine idle-stops. An engine controller may be configured to perform control routines, such as the example routines of FIGS. 2 and 3, to generate an engine sound during engine start-stop operations so that an engine idling sound as audible to the operator in the vehicle cabin may be seamlessly maintained during an engine idle-stop. An example generation of engine sound during an engine start-stop operation is shown in FIG. 4.

Figure 1:
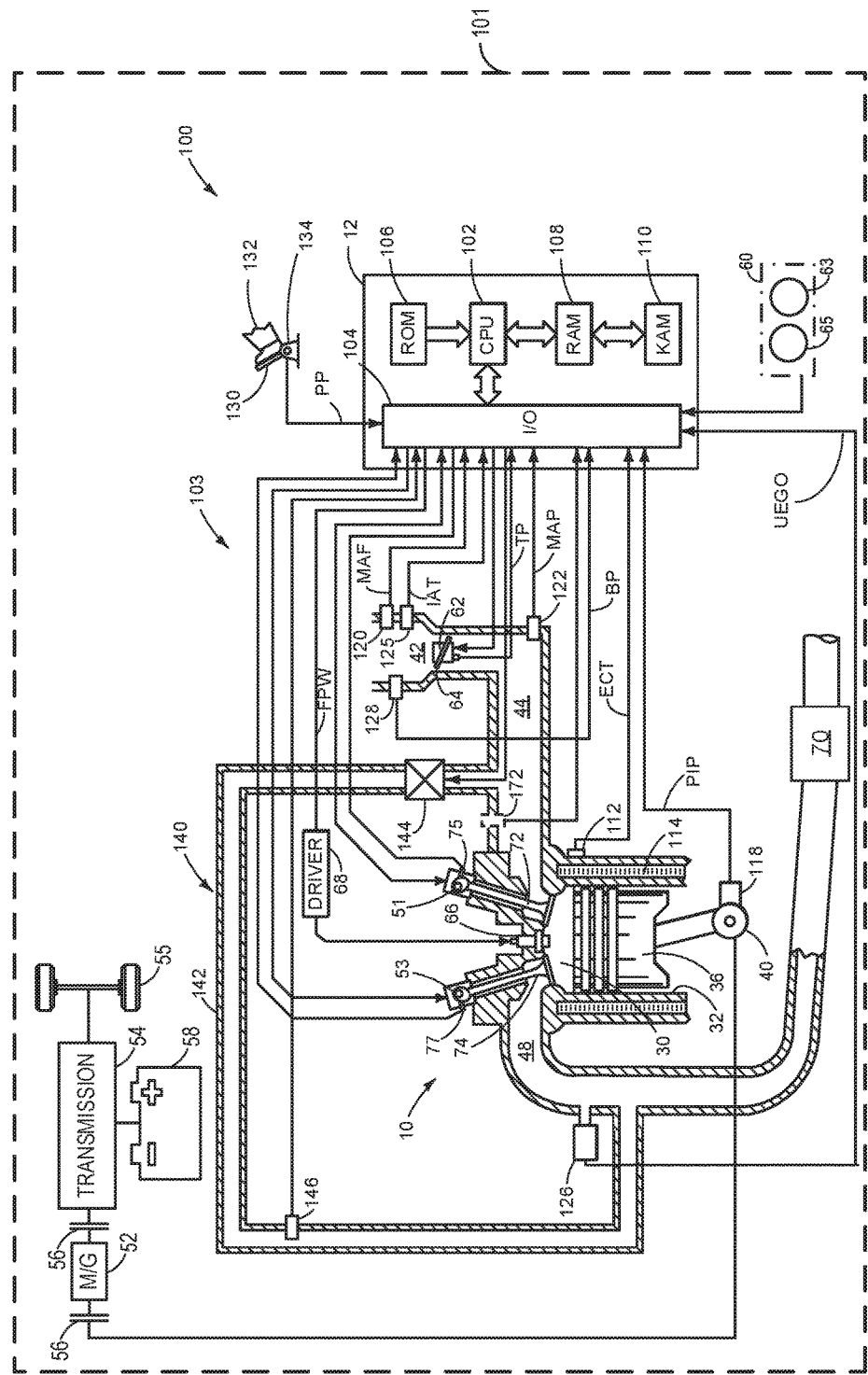
FIG. 1 shows an example vehicle system including a dashboard microphone and a speaker.

FIG. 1 is a schematic diagram showing a vehicle system 100 comprising a vehicle 101 and an engine system 103. FIG. 1 shows one cylinder of a multi-cylinder engine 10 in the engine system 103. The engine 10 may be controlled at least partially by a control system including a controller 12 and by input from a vehicle operator 132 via an input device 130. In this example, the input device 130 includes an accelerator pedal and a pedal position sensor 134 for generating a proportional pedal position signal PP. A combustion chamber (cylinder) 30 of the engine 10 may include combustion chamber walls 32 with a piston 36 positioned therein. The piston 36 may be coupled to a crankshaft 40 so that reciprocating motion of the piston is translated into rotational motion of the crankshaft. The crankshaft 40 may be coupled to at least one drive wheel of a vehicle via an intermediate transmission system. Further, a starter motor may be coupled to the crankshaft 40 via a flywheel to enable a starting operation of the engine 10. A position of the crankshaft may be determined via a Hall effect sensor (crankshaft signal sensor) 118 coupled to the crankshaft 40. In one example, the sensor 118, which is also used as an engine speed sensor, may produce a predetermined number of equally spaced pulses every revolution of the crankshaft. Based on an engine speed, as determined based on input from the sensor 118, the controller may determine a corresponding engine sound produced during engine operation.

The combustion chamber 30 may receive intake air from an intake manifold 44 via an intake passage 42 and may exhaust combustion gases via an exhaust passage 48. The intake manifold 44 and the exhaust passage 48 can selectively communicate with the combustion chamber 30 via respective intake valve 72 and exhaust valve 74. In some embodiments, the combustion chamber 30 may include two or more intake valves and/or two or more exhaust valves.

In this example, the intake valve 72 and exhaust valve 74 may be controlled by cam actuation via respective cam actuation systems 51 and 53. The cam actuation systems 51 and 53 may each include one or more cams and may utilize one or more of cam profile switching (CPS), variable cam timing (VCT), variable valve timing (VVT), and/or variable valve lift (VVL) systems that may be operated by the controller 12 to vary valve operation. The position of the intake valve 72 and exhaust valve 74 may be determined by position sensors 75 and 77, respectively. In alternative embodiments, the intake valve 72 and/or exhaust valve 74 may be controlled by electric valve actuation. For example, the combustion chamber 30 may alternatively include an intake valve controlled via electric valve actuation and an exhaust valve controlled via cam actuation including CPS and/or VCT systems.

A fuel injector 66 is shown coupled directly to combustion chamber 30 for injecting fuel directly therein in proportion to the pulse width of signal FPW received from the controller 12 via an electronic driver 68. In this manner, the fuel injector 66 provides what is known as direct injection of fuel into the combustion chamber 30. The fuel injector may be mounted in the side of the combustion chamber or in the top of the combustion chamber (as shown), for example. Fuel may be delivered to the fuel injector 66 by a fuel system (not shown) including a fuel tank, a fuel pump, and a fuel rail. In some embodiments, the combustion chamber 30 may alternatively or additionally include a fuel injector arranged in the intake manifold 44 in a configuration that provides what is known as port injection of fuel into the intake port upstream of the combustion chamber 30.

The intake passage 42 may include a throttle 62 having a throttle plate 64. In this particular example, the position of throttle plate 64 may be varied by the controller 12 via a signal provided to an electric motor or actuator included with the throttle 62, a configuration that is commonly referred to as electronic throttle control (ETC). In this manner, the throttle 62 may be operated to vary the intake air provided to the combustion chamber 30 among other engine cylinders. The position of the throttle plate 64 may be provided to the controller 12 by a throttle position signal TP. The air intake passage 42 may include the intake air temperature (IAT) sensor 125 and the barometric pressure (BP) sensor 128. The IAT sensor 125 estimates intake air temperature to be used in engine operations and provides a signal to the controller 12. Similarly, the BP sensor 128 estimates the ambient pressure for engine operations and provides a signal to the controller 12. The intake passage 42 may further include a mass air flow sensor 120 and a manifold air pressure sensor 122 for providing respective signals MAF and MAP to the controller 12.

An exhaust gas sensor 126 is shown coupled to the exhaust passage 48 upstream of an emission control device 70. The sensor 126 may be any suitable sensor for providing an indication of exhaust gas air/fuel ratio (AFR) such as a linear oxygen sensor or UEGO (universal or wide-range exhaust gas oxygen), a two-state oxygen sensor or EGO, a HEGO (heated EGO), a NOx, HC, or CO sensor.

The emission control device 70 is shown arranged along the exhaust passage 48 downstream of the exhaust gas sensor 126. The device 70 may be a three way catalyst (TWC), NOx trap, various other emission control devices, or combinations thereof. In some embodiments, during operation of the engine 10, the emission control device 70 may be periodically reset by operating at least one cylinder of the engine within a particular air/fuel ratio.

Further, an exhaust gas recirculation (EGR) system 140 may route a desired portion of exhaust gas from the exhaust passage 48 to the intake manifold 44 via an EGR passage 142. The amount of EGR provided to the intake manifold 44 may be varied by the controller 12 via an EGR valve 144. Further, an EGR sensor 146 may be arranged within the EGR passage 142 and may provide an indication of one or more of pressure, temperature, and constituent concentration of the exhaust gas. A linear oxygen sensor 172 may be positioned at the intake passage, downstream of the intake throttle, to facilitate EGR regulation. Under some conditions, the EGR system 140 may be used to regulate the temperature of the air and fuel mixture within the combustion chamber, thus providing a method of controlling the timing of ignition during some combustion modes. Further, during some conditions, a portion of combustion gases may be retained or trapped in the combustion chamber by controlling exhaust valve timing, such as by controlling a variable valve timing mechanism.

The vehicle 101 may include a dashboard 60. A microphone 63 and a speaker 65 may be coupled to the dashboard 60. The microphone 63 may be used to record sounds from the vehicle cabin. The recorded sounds may include for example engine sounds, as audible to the operator, as well as environmental sounds including that of traffic. Recorded engine sounds may include engine idling sound, engine revving up sound, etc. In one example, the speaker 65 and the microphone 63 may be part of an audio system of the vehicle and may be used by the operator to play music, radio, etc.

During conditions when the operator torque demand decreases to below a threshold, such as when the vehicle is stopped at a traffic signal, the engine may idle until the torque demand increases. Prolonged idling may adversely affect fuel economy and emissions quality. In response to engine idle-stop conditions being met, an automatic start-stop operation may be carried out to reduce the duration of engine idling. For example, if it is determined that the engine has been idling for longer than a threshold duration, combustion may be suspended and engine operation may be stopped (idle-stop). In response to engine idle-start conditions being met, engine may be restarted (idle-start) and combustion may be resumed. When the engine is idling, an engine sound may be audible to the operator. However, at engine idle-stop, when combustion is suspended, the engine sound may change as the engine spins-down. Further, once the engine spins down to rest there may be no engine sound audible to the operator. Subsequently, at engine restart, when combustion is resumed, there may be an inherent engine sound corresponding to engine spin-up, which changes as the engine reaches a stabilized (target) idling speed. Such perceivable changes in engine sound during the engine start-stop operation may be both perceivable and objectionable to the operator.

For example, as elaborated herein, the controller may play an engine sound during engine start-stop operation to make any changes in inherent engine sound mas unperceivable as possible. During selected warm idling conditions, such as when one or more of engine idling speed is lower than a threshold speed and ambient temperature is higher than a threshold temperature, an engine idling sound may be recorded immediately prior to suspension of engine combustion on an idle-stop via the dashboard microphone 63. An engine audio signal may be produced by filtering the engine idling sound to remove peripheral noise. During conditions when one or more of engine idling speed is lower than a threshold speed and ambient temperature is higher than a threshold temperature, an engine audio signal may be selected from a database to be played during the start-stop operation. The selection of the engine audio signal may be based on an inherent engine idling speed immediately prior to the idle-stop. The database may comprise a collection of engine idling sounds recorded at different engine idling speeds and engine temperatures. Following an engine idle-stop request, as the engine spins-down, a first modified version of the selected audio signal may be played, via the speaker 65, to cancel an inherent engine spin-down sound while generating a residual sound audible to the operator. The residual sound and the selected sound may have a common waveform. Due to the common waveform of the residual sound and the selected engine audio signal, the operator may not detect any significant change in engine sound from the engine idling sound (prior to the idle-stop) as the engine spins down. During engine rest following the engine spin-down, an unmodified version of the selected engine audio signal may be played via the microphone 63 to mask the silence caused by the lack of an inherent engine sound. Responsive to idle-start conditions following an idle-stop, as the engine spins-up, a second modified version of the selected audio signal may be played, via the microphone 63, to cancel an inherent engine spin-up sound and to generate the residual sound. Subsequent to the engine spin-up, as the engine reaches the target engine idling speed, the second modified version of the selected engine audio signal may be synchronized with the inherent (actual) engine idling sound and then the second modified version of the selected engine audio signal may be phased out. In one example, the controller may use an algorithm to compare the selected engine audio signal and the inherent engine idling sound and determine a modification to the selected engine audio signal to obtain a consistent second modified version of the selected engine audio signal. In another example, the comptroller may adjust the frequency and amplitude of the selected engine audio signal based on an actual (measured) engine speed and the amplitude of the selected engine audio signal may be increased as the engine speed decreases.

Figure 2:
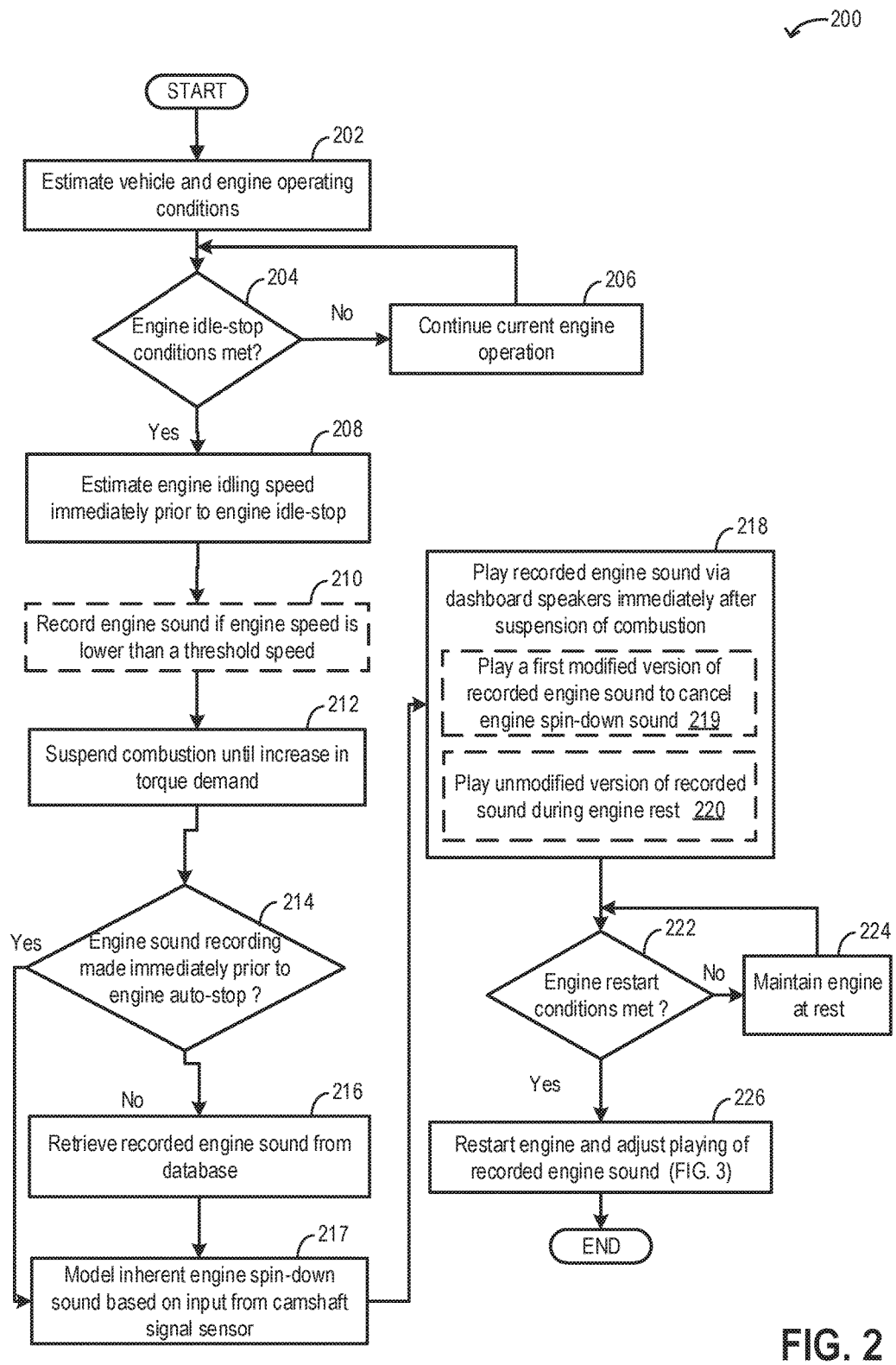
FIG. 2 shows a flow chart illustrating an example method that can be implemented to generate engine sound during an engine idle-stop.
Figure 3:
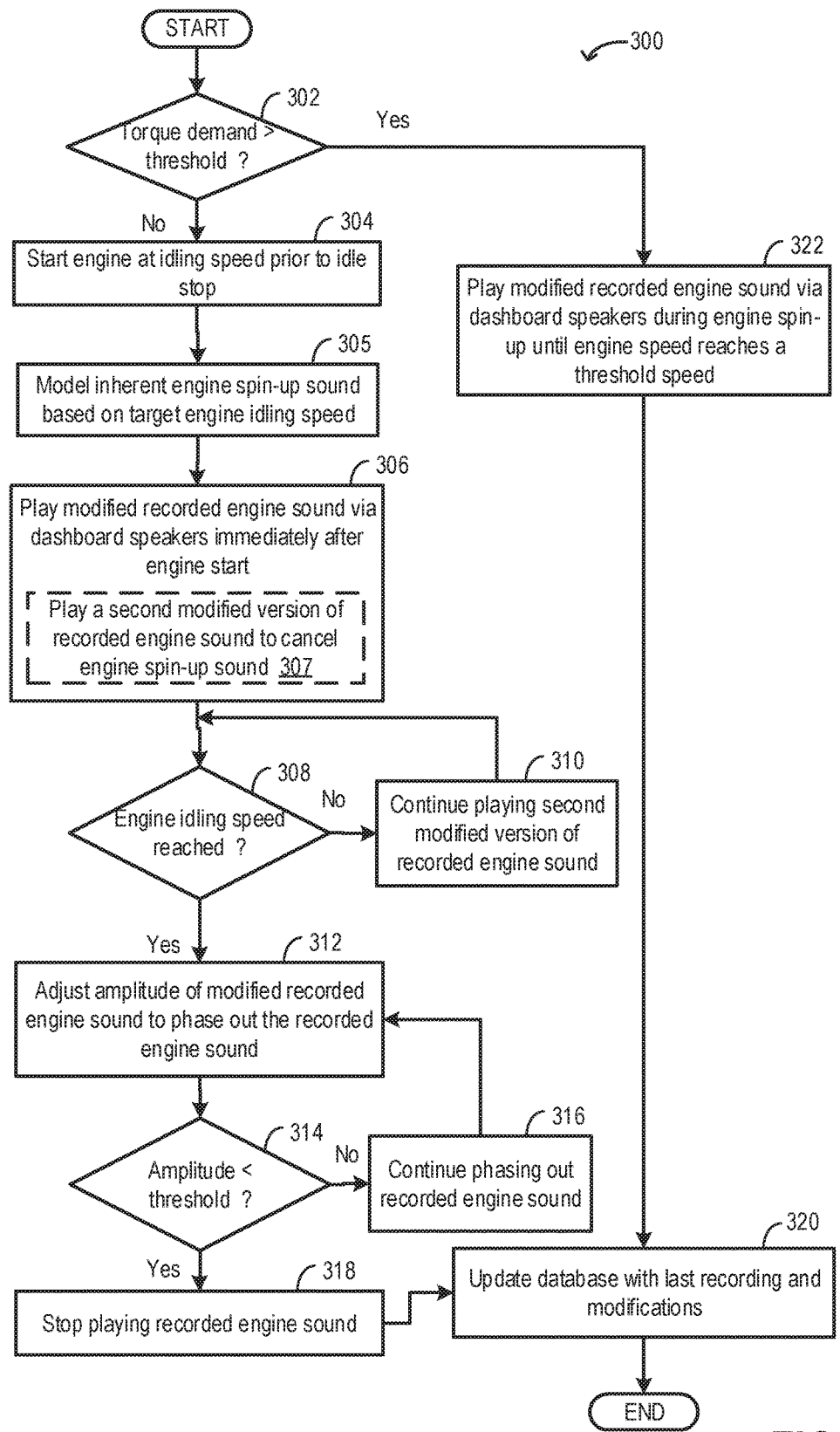
FIG. 3 shows a flow chart illustrating an example method that can be implemented to generate engine sound during an engine restart following an engine idle-stop.
Figure 4:
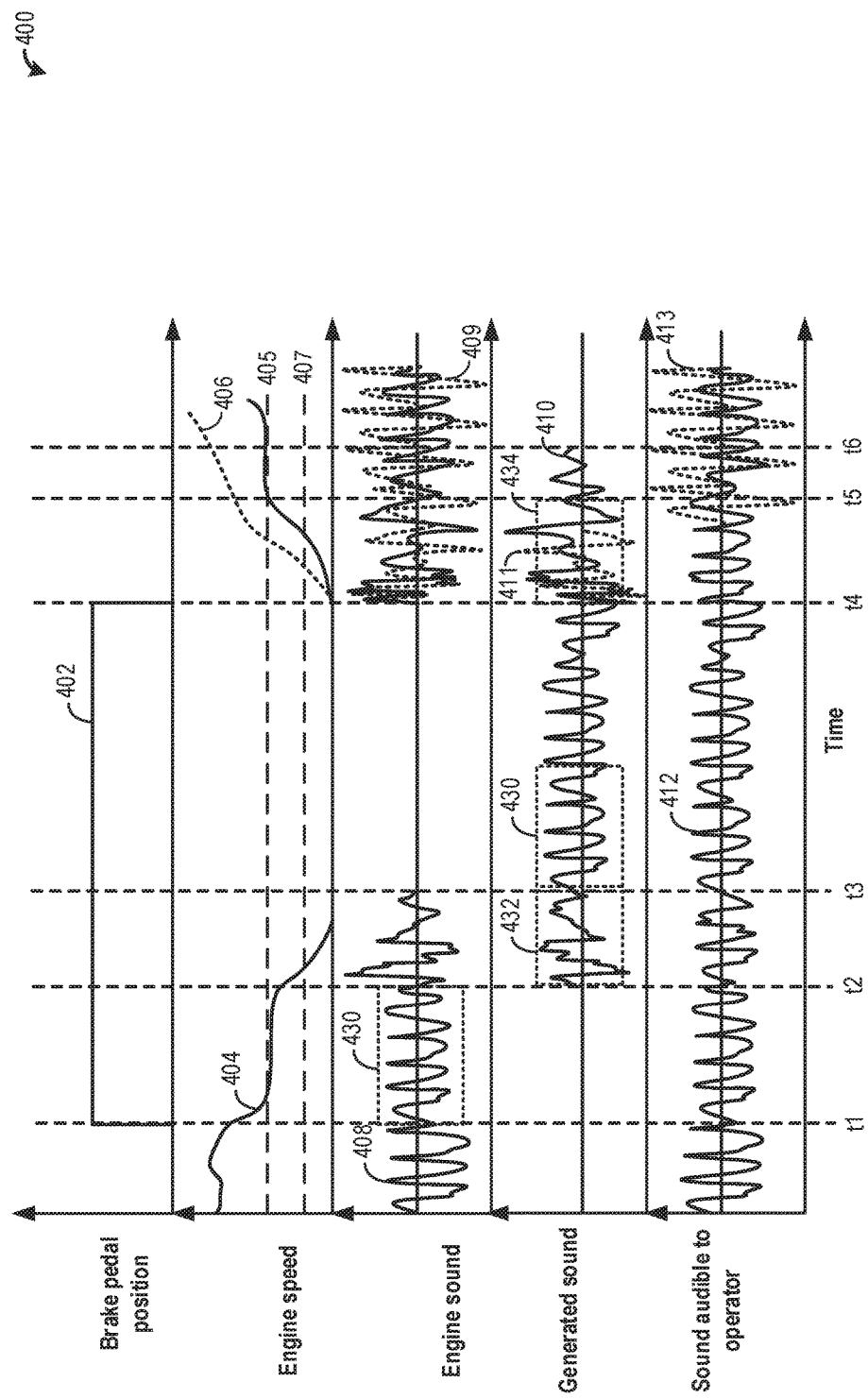
FIG. 4 shows an example generation of engine sound during an engine idle-stop operation.

As discussed in details in FIGS. 2 and 3, by synchronizing the modified version of the selected engine audio signal (as played via the speaker) with the inherent engine idling sound, a change in phase and sound quality may be made less perceivable to the operator as the engine sound changes from engine spin-up sound to engine idling sound. Also, by gradually phasing out the engine audio signal, abrupt changes in sound that is audible to the operator may be reduced.

The controller 12 is shown in FIG. 1 as a microcomputer, including a microprocessor unit 102, input/output ports 104, an electronic storage medium for executable programs and calibration values shown as read only memory chip 106 in this particular example, random access memory 108, keep alive memory 110, and a data bus. The controller 12 may receive various signals from sensors coupled to the engine 10, in addition to those signals previously discussed, including measurement of exhaust and intake AFR from oxygen sensors 126 and 172 respectively, inducted mass air flow (MAF) from the mass air flow sensor 120; engine coolant temperature (ECT) from a temperature sensor 112 coupled to a cooling sleeve 114; a profile ignition pickup signal (PIP) from a Hall effect sensor 118 (or other type) coupled to crankshaft 40; throttle position (TP) from a throttle position sensor; and absolute manifold pressure signal, MAP, from the sensor 122. Engine speed signal, RPM, may be generated by the controller 12 from signal PIP. Manifold pressure signal MAP from a manifold pressure sensor may be used to provide an indication of vacuum, or pressure, in the intake manifold. Note that various combinations of the above sensors may be used, such as a MAF sensor without a MAP sensor, or vice versa. During stoichiometric operation, the MAP sensor can give an indication of engine torque. Further, this sensor, along with the detected engine speed, can provide an estimate of charge (including air) inducted into the cylinder.

The storage medium read-only memory 106 can be programmed with computer readable data representing non-transitory instructions executable by the processor 102 for performing the methods described below as well as other variants that are anticipated but not specifically listed. As described above, FIG. 1 shows one cylinder of a multi-cylinder engine, and each cylinder may similarly include its own set of intake/exhaust valves, fuel injector, spark plug, etc.

The controller 12 receives signals from the various sensors of FIG. 1 and employs the various actuators of FIG. 1 to adjust engine operation based on the received signals and instructions stored on a memory of the controller 12. In one example, in response to a lower than threshold engine load for a longer than threshold duration, the controller may initiate an engine idle-stop by sending a signal to the fuel injectors 66 to suspend engine cylinder fuel injection. In another example, during the engine idle-stop, the controller may generate and play modified versions of an engine audio signal via the dashboard speaker 65 to mask the inherent engine sounds associated with the idle-stop.

In some examples, vehicle 101 may be a hybrid vehicle with multiple sources of torque available to one or more vehicle wheels 55. In other examples, vehicle 101 is a conventional vehicle with only an engine, or an electric vehicle with only electric machine(s). In the example shown, vehicle 101 includes engine 10 and an electric machine 52. Electric machine 52 may be a motor or a motor/generator. Crankshaft 40 of engine 10 and electric machine 52 are connected via a transmission 54 to vehicle wheels 55 when one or more clutches 56 are engaged. In the depicted example, a first clutch 56 is provided between crankshaft 140 and electric machine 52, and a second clutch 56 is provided between electric machine 52 and transmission 54. Controller 12 may send a signal to an actuator of each clutch 56 to engage or disengage the clutch, so as to connect or disconnect crankshaft 40 from electric machine 52 and the components connected thereto, and/or connect or disconnect electric machine 52 from transmission 54 and the components connected thereto. Transmission 54 may be a gearbox, a planetary gear system, or another type of transmission. The powertrain may be configured in various manners including as a parallel, a series, or a series-parallel hybrid vehicle.

Electric machine 52 receives electrical power from a traction battery 58 to provide torque to vehicle wheels 55. Electric machine 52 may also be operated as a generator to provide electrical power to charge battery 58, for example during a braking operation.

In this way, the system of FIG. 1 enables a system for a vehicle comprising: a vehicle, a dashboard including a speaker and a microphone, an engine including a crankshaft sensor and an engine coolant temperature sensor, and a controller with computer readable instructions stored on non-transitory memory for: recording engine sounds during engine combustion including during engine idling via the speaker, storing the recordings in a database, and responsive to idle-stop conditions, spinning down the engine, selecting a sound from the recorded engine sounds based on an engine idling speed immediately prior to engine spin-down, and playing a first modified version of the selected sound to cancel an inherent engine spin-down sound and generate a residual sound, via the speaker, wherein the residual sound and the selected sound have a common waveform.

FIG. 2 shows an example method 200 for generating engine sound during an engine idle-stop. Instructions for carrying out method 200 and the rest of the methods included herein may be executed by a controller based on instructions stored on a memory of the controller and in conjunction with signals received from sensors of the engine system, such as the sensors described above with reference to FIG. 1. The controller may employ engine actuators of the engine system to adjust engine operation, according to the methods described below.

At 202, current vehicle and engine operating conditions may be estimated and/or measured. These may include, for example, operator torque demand, engine speed, vehicle speed, engine temperature, engine load, ambient conditions (such as ambient humidity, temperature, and barometric pressure), exhaust temperature, manifold pressure, manifold air flow, battery state of charge, etc.

At 204, the routine includes determining if engine idle-stop conditions are met and if engine spin-down may be initiated. Conditions for engine idle-stop may include engine idling for a longer than threshold duration. For example, engine idling may take place while the vehicle is at a traffic stop when the engine load is below a threshold (such as when the vehicle is stationary). Engine operation at the idling speed for a longer than threshold duration may result in increased fuel usage and increased level of exhaust emissions. Also, the threshold duration may be based on fuel level in the fuel tank. In one example, if the fuel level in the fuel tank is lower than a threshold level, the threshold duration may be decreased such that additional fuel may not be consumed for engine idling.

Engine idle-stop conditions may further include a greater then battery state of charge (SOC). The controller may check battery SOC against a preset minimum threshold and if it is determined that the battery SOC is at least more that 30% charged, automatic engine stop may be enabled. Confirming engine idle-stop conditions may further include an indication that a motor of a starter/generator is operation ready. The status of an air conditioner may be checked and before initiating an engine idle-stop, it may be verified that the air conditioner did not issue a request for restarting the engine, as may be requested if air conditioning is desired. The intake air temperature may be estimated and/or measured to determine if it is within a selected temperature range. In one example, the intake temperature may be estimated via a temperature sensor located in the intake manifold and an engine idle-stop may be initiated when the intake air temperature is above a threshold temperature. Also, the engine temperature may be estimated and/or measured to determine if it is within a selected temperature range. In one example, the engine temperature may be inferred from an engine coolant temperature and an engine idle-stop may be initiated when the engine coolant temperature is above a threshold engine temperature. The driver requested torque may be estimated and confirmation of an engine idle-stop may be initiated in response to a lower than threshold driver requested torque. The vehicle speed may be estimated and assessed whether it is below a predetermined threshold. For example, if the vehicle speed is lower than a threshold (e.g., 3 mph) an engine idle-stop may be requested even if the vehicle is not at rest. Further, an emission control device coupled to the exhaust manifold of engine may be analyzed to determine that no request for engine restart was made.

If it is determined that engine idle-stop conditions are not met, at 206, current engine operations may be continued without initiating the engine start-stop operation such as the engine may be maintained running with cylinders combusting fuel. If it is confirmed that engine idle-stop conditions are met, at 208, the engine idling speed immediately prior to engine idle-stop may be estimated. The engine idling speed may vary based on engine operating parameters including engine temperature. In one example, the engine idling speed may decrease as the engine temperature increases. In another example, the engine idling speed may increase as the engine temperature decreases. The current idling speed may be estimated based on input from a crankshaft signal sensor (such as Hall effect sensor 118 in FIG. 1).

At 210, before initiating the idle-stop, an engine sound (audio signal) may be optionally recorded if the engine idling speed is lower than a threshold speed. A lower than threshold engine idling speed may indicate a higher than threshold engine temperature (warm engine). A warm engine idling sound may be less objectionable and more familiar to the operator relative to a cold engine idling sound (sound produced during operation of a cold engine at a lower than threshold engine temperature). The waveform of a warm engine idling sound may be more consistent for use in masking inherent engine sounds during engine start-stop operations. A microphone located in the dashboard of the vehicle may be used to record the engine sound prior to engine idle-stop. By using a microphone located in close proximity to the operator, the engine sound that is audible and familiar to the operator in the vehicle cabin may be recorded. The engine sound may be recorded as a single recording or as multiple recordings until the engine idle-stop. Since the sound recording is made using the dashboard microphone, in addition to engine sound, peripheral noise such as traffic, conversation, and audio played by the operator may also be recorded. The sound recording may be processed to remove such peripheral noises such that solely the engine sound produced immediately prior to engine idle-stop may be extracted and saved. In one example, a plurality of filters (such as low-pass filters and high-pass filters) may be used to process the recorded sound to obtain the engine sound. In another example, a bandwidth of a filter may be adjusted as a function of engine speed (inherent engine idling sound is a function of engine speed) to selectively include the inherent engine idling sound while removing the peripheral noises. As such, if the engine idling speed is higher than the threshold speed, the engine idling sound may not be recorded.

At 212, in response to the engine idle-stop conditions being met, combustion may be suspended to idle-stop the engine. In order to suspend combustion, fueling to the engine cylinders may be suspended. The controller may send a signal to one or more fuel injectors coupled to the engine cylinders to stop fuel injection to each of the cylinders. Also, the controller may send a signal to the spark plug coupled to each cylinder to disable spark. Once the combustion is suspended, the engine may spin-down and the engine speed may gradually decrease to zero. The engine may be maintained at rest until restart conditions are met.

At 214, the routine includes determining if a recording of engine sound has been made immediately prior to engine idle-stop. In one example, the controller may determine if a recording of engine sound has been made at step 210 of routine 200. If it is determined that a recording of engine sound has not been made immediately prior to engine idle-stop, such as if the engine idling speed immediately prior to suspension of combustion was higher than the threshold engine idling speed, at 216, a pre-recorded engine sound (audio signal) may be retrieved from a database having a plurality of engine sounds. The database may include engine sounds recorded at a plurality of engine operating speeds such as during engine idling, engine revving, etc. The selected pre-recorded sound may correspond to an engine idling speed similar to (such as in the same range as) the engine idling speed immediately prior to suspension of combustion. Recording of engine sound may be carried out during engine operation at different engine speeds and these recordings may be stored in the database.

In one example, the database may be updated by periodically recording engine sound, (such as once every week) immediately prior to an engine idle-stop. In another example, every time an engine start-stop operation is initiated, the engine sound immediately prior to suspension of combustion may be recorded and saved in the database. Each sound recording may have a length of 1 to 5 seconds. Also, each time an engine sound is recorded, the recording may be processed via a plurality of filters to remove all peripheral noises including traffic noise, conversation, audio played in the cabin, such that the engine sound produced immediately prior to engine idle-stop may be extracted and saved.

In one example, a modeled baseline audio signal may be stored in the database and during lower than threshold engine idling speed, the baseline audio signal may be modified to produce an engine sound similar to a desired engine idling sound. The desired engine idling sound may be the inherent engine idling sound immediately prior to the engine idle-stop. If it is determined that a recording of engine sound has not been made immediately prior to engine idle-stop, the baseline audio signal may be retrieved from the database and modified based on engine operating conditions including the ambient temperature, ambient humidity, pressure, and the engine idling speed, to produce a desired engine audio signal.

If it is determined that engine sound recording was made (and is available) immediately prior to the engine idle-stop, the routine may directly proceed to step 217. Also, upon retrieving a recorded engine sound from the database, the routine may proceed to step 217.

At 217, during engine spin-down, an inherent engine spin-down sound may be modeled based on an engine speed sensed via the camshaft signal sensor immediately prior to suspension of combustion, the inherent engine spin-down sound including a first waveform having a first phase and a first amplitude. The inherent engine spin-down sound may be the sound produced when the engine spins down upon suspension of combustion. In one example, the controller may model the first waveform of the inherent engine spin-down engine sound through a determination that directly takes into account a measured engine idling speed. In another example, the controller may determine the engine sound based on a calculation using a look-up table with the input being engine idling speed immediately prior to suspension of combustion and the output being engine sound. The inherent engine spin-down sound may be distinct from the inherent engine idling sound.

At 218, the recorded engine sound may be played immediately after suspension of combustion so that the inherent engine spin-down sound may be effectively masked. The timing of initiation of playback of the recorded engine sound may be adjusted to synchronize the phase of the recorded engine sound with the phase of the inherent engine spin-down sound. In one example, the timing of initiation of playback of the recorded engine sound may be adjusted (such as preponed or postponed from the moment of suspension of combustion) to minimize the phase difference between the inherent engine spin-down sound and the recorded sound. By synchronizing the phase of the recorded engine sound with the phase of the inherent engine spin-down sound, the initiation of the playback of the recorded sound may not be perceivable to the operator. The recorded engine sound may be played via the dashboard speakers such that the engine sound may be audible to the operator in the passenger cabin. In one example, the engine sound may be played in addition to an audio played by the operator using the dashboard speakers.

As combustion is suspended, the engine sound may change from the sound corresponding to engine idling to the sound corresponding to engine spin-down and then as the engine stops spinning the engine sound may entirely die down. Playing the recorded engine sound includes, at 219, playing a first modified version of the recorded engine sound during the engine spin-down to mask the perceivable engine spin-down sound. The recorded engine sound may include a second waveform having a second phase and a second amplitude. Producing the first modified version of the recorded sound includes producing a first antiphase waveform having the first amplitude (of the inherent engine spin-down sound) and a phase opposite to the first phase of the inherent engine spin-down sound and adding the first antiphase waveform to the second waveform of the recorded sound. The phase difference between the second waveform of the inherent engine spin-down sound and the first antiphase waveform may be 180°.

As the first modified version of the recorded engine sound is superimposed on the engine spin-down sound, the inherent engine spin-down sound may be cancelled due to destructive interference. After cancellation of the engine spin-down sound, a residual sound may be produced, wherein the residual sound and the recorded sound may have a common waveform (similar amplitude and phase). Therefore, the resultant sound may be substantially same as the engine idling sound prior to suspension of combustion. By using a modified version of a recorded engine idling sound, the engine spin-down sound may be cancelled and a resultant engine idling sound may be played during engine spin-down. In this way, the engine idling sound may be seamlessly maintained during the engine spin-down and there may not be a perceivable change in engine sound after combustion is suspended.

At 220, an unmodified version of the recorded engine idling sound may be played, via the dashboard speaker, during engine rest (following the engine spin-down) to maintain the sound level audible to the operator prior to suspension of combustion. During the engine rest, there may not be any audible engine sound, and playing of the recorded engine sound may reduce any perception of engine idle-stop. The volume of the sound played back may be adjusted to be similar to the volume of engine sound audible to the operator prior to suspension of combustion and also during the engine spin-down.

At 222, the routine includes determining if engine restart conditions are met. In one example, engine restart conditions following an engine idle-stop may include an increase in engine load. In one example, the controller may determine if the brake pedal is released. The accelerator pedal position may also be determined, for example via a pedal position sensor, to determine whether the accelerator pedal has been engaged in addition to the release of the brake pedal. The status of the air conditioner may be checked to verify whether a request has been made to restart, as may be made when air conditioning is desired. The SOC of battery may be estimated to estimate if it is below a predetermined threshold. In one example, it may be desired that battery be at least 30% charged. Accordingly, engine starting may be requested to charge the battery to a desired value.

The engine restart conditions may further include, a request from an emission control device to restart the engine has been made. In one example, the emission control device temperature may be estimated and/or measured by a temperature sensor, and if the temperature is below a predetermined threshold, an engine restart may be requested. The vehicle speed may be estimated and assessed whether it is above the predetermined threshold. For example, if the vehicle speed is greater than a threshold (e.g., 3 mph) an engine start may be requested. It may be determined whether the electrical load of the engine is above a predetermined threshold, in response to which an engine start is requested (e.g., to reduce draining of the battery). In one example, the electrical load may comprise user operated accessory devices, electrically powered air-conditioning, etc.

If it is determined that the engine start conditions have not been met, at 224, engine may be maintained in the stopped condition, and combustion may not be resumed. Also, the playback of pre-recorded engine idling sound may be continued during the engine stop.

If it is determined that engine restart conditions are met, at 226, the engine may be restarted. As the engine spins-up and then a target engine speed is attained, there may be a change in perceivable engine sound. In order to mask the change in engine sound during engine spin-up, a second modified version of the recorded engine sound may be played during the engine spin-up. Details of the adjustments to the recorded engine sound during engine restart is described in relation to FIG. 3.

FIG. 3 illustrates an example method 300 that can be implemented to adjust a recorded engine sound during an engine restart following an engine idle-stop. Method 300 may be a part of the method 200 and may be carried out at step 226 of method 200.

At 302, the routine includes determining if a driver torque demand while an engine is at idle-stop is greater than a threshold torque. In one example, an increase in driver torque demand may be based on an operator tipping in the accelerator pedal. In one example, the threshold torque may correspond to a torque demand at which the engine may be restarted at a target restart speed higher than an engine idling speed.

If it is determined that the driver torque request at engine restart is lower than the threshold torque, at 304, the engine may be restarted to a target idling speed which is same (or similar to) as the idling speed immediately prior to the idle-stop. Upon engine restart, combustion may be resumed by initiating fueling to the engine cylinders. The controller may send a signal to one or more fuel injectors coupled to the engine cylinders to restart fuel injection to each of the cylinders. Also, the controller may send a signal to the spark plug coupled to each cylinder to enable spark. Once the combustion is resumes, the engine may spin-up and the engine speed may gradually decrease to the target idling speed.

During engine spin-up, at 305, an inherent engine spin-up sound may be modeled based on the target engine idling speed, the inherent engine spin-up sound including a third waveform having a third phase and a third amplitude. The inherent engine spin-up sound may be the sound produced when the engine spins up upon resuming combustion. In one example, the controller may model the third waveform corresponding to the inherent engine spin-up sound through a determination that directly takes into account the target engine idling speed. In another example, the controller may determine the engine spin-up sound based on a calculation using a look-up table with the input being engine idling speed immediately prior to suspension of combustion (which is the target engine idling speed after engine restart) and the output being engine sound. At 306, the recorded engine sound played during the engine idle-stop may be played immediately after resuming engine combustion. The recorded engine sound may be played via the dashboard speakers such that the engine sound may be audible to the operator in the passenger cabin. In one example, the engine sound may be played in addition to an audio played by the operator using the dashboard speakers.

Playing the recorded engine sound may include, at 307, playing a second modified version of the recorded engine sound during the engine spin-up to mask the perceivable engine spin-up sound. The recorded engine sound may include a second waveform having a second phase and a second amplitude. Producing the second modified version of the recorded sound includes: producing a second antiphase waveform having the third amplitude (of the inherent engine spin-up sound) and a phase opposite to the third phase of the inherent engine spin-up sound and then adding the second antiphase waveform to the second waveform of the recorded sound.

As the second modified version of the recorded engine sound is superimposed with the engine spin-up sound, the inherent engine spin-up sound may be cancelled due to destructive interference. After cancellation of the engine spin-up sound, a residual sound may be produced, wherein the residual sound and the recorded (unmodified) sound has a common waveform (similar amplitude and phase). Therefore, the resultant sound may be substantially same as the target engine idling sound (also same as the engine idling sound immediately prior to engine idle-stop). As the second modified engine sound is played during the engine spin-up, at least a phase of the second modified engine sound (as generated through the electronic dashboard speaker) may be adjusted to align the phase of resultant sound with that of the inherent engine spin-up sound. As such, the amplitude and the phase of the second modified version of the recorded sound may be adjusted such that the second modified version of the recorded sound may be synchronized with the inherent engine spin-up sound. By using a modified version of a recorded engine idling sound, the engine spin-up sound may be cancelled and a resultant engine idling sound may be synchronized with the inherent engine sound during engine spin-up. In this way, the engine idling sound may be seamlessly maintained during the engine spin-up and there may not be a perceivable change in engine sound after combustion is resumed.

At 308, the routine includes determining if the engine spin-up is complete and the target engine idling speed has been reached. If it is determined that the target engine idling speed has not been reached and the engine continues to spin-up, at 310, the second modified recorded engine sound may continue to be played during engine spin-up.

If it is determined that the engine speed has reached the target engine idling speed, at 318, a third modified version of the recorded sound may be played. Playing the third modified version of the recorded sound may include adjusting the second waveform of the recorded sound to phase align with an inherent engine idling sound. In the third modified version of the recorded sound, the phase of the recorded engine sound may be adjusted to align with the phase of the inherent engine idling sound while the amplitude of the recorded engine sound may be progressively reduced. In one example, the third modified version of the recorded sound, the phase of the recorded engine sound may be continually adjusted (in real-time) based on a difference between the modified version of the recorded sound being played and the inherent engine idling sound.

At 314, the routine includes determining if the reduced amplitude of the recorded engine sound has reached a threshold amplitude. As the amplitude of the generated sound is reduced, the volume of the sound reduces. The threshold amplitude may be based on the inherent engine idling speed producing an inherent engine idling sound. In one example, in response to an inherent engine idling sound of a higher amplitude, the threshold amplitude may be increased. In another example, in response to an inherent engine idling sound of a lower amplitude, the threshold amplitude may be decreased.

If it is determined that the amplitude of the recorded engine sound is higher than the threshold amplitude, at 316, phasing out of the recorded sound may be continued and the amplitude of the recorded sound may be reduced until the amplitude reaches the threshold. If it is determined that the amplitude of the recorded sound has reduced to the threshold amplitude, at 318, the controller may stop playing the recorded sound. Additionally or alternatively, upon completion of engine spin-up, the controller may continue phasing out the recorded engine sound for a threshold number of engine cycles and then after completion of the threshold number of engine cycles, playing of the recorded engine sound may be suspended. The threshold number of engine cycles may vary in each engine start and may be based on the inherent engine idling speed. In one example, in response to an inherent engine idling sound of a higher amplitude, the threshold number of engine cycles over which the generated sound is phased out may be increased. In another example, in response to an inherent engine idling sound of a lower amplitude, the threshold number of engine cycles over which the generated sound is phased out may be decreased. Additionally or alternatively, upon completion of engine spin-up, the controller may continue phasing out the recorded engine sound for a threshold duration after the engine speed reaches the target idling speed and then after completion of the threshold duration, playing of the recorded engine sound may be suspended. The threshold duration may be based on the inherent engine idling speed. In one example, in response to an inherent engine idling sound of a higher amplitude, the threshold duration may be increased and in response to an inherent engine idling sound of a lower amplitude, the threshold duration may be decreased.

In this way, by cancelling engine spin-up sound and then phasing out the recorded sound, there may not be any perceivable change in engine sound during the restart from the idle-stop.

At 320, the database may be updated with the audio signal of the last recorded engine sound. Further, the database may be updated with the first modified version (as generated during the engine spin-down) and the second modified version (as generated during the subsequent engine spin-up) of the recorded sound. Calibrations, such as modifications to shaping factors of the recorded sound, may be learned and updated. Engine sounds may be learned as a function of the engine idling speed before the idle-stop and the target engine speed after the engine start and included in the database. In this way, after each engine idle-stop, the database may be updated with the engine audio signals generated and used during the idle-stop.

If at 302 it is determined that the driver torque request at engine restart is higher than the threshold torque, or if the engine restart request is in response to the operator tipping in the accelerator pedal, it may be inferred that the target engine speed at engine restart may be to an engine speed that is higher than an engine idling speed (such as the idling speed prior to the idle-stop). At 322, the second modified version of the recorded sound may be played via the dashboard speakers during the engine spin-up until the engine speed reaches a threshold speed, wherein the threshold speed may be lower than the target engine speed at restart. Once the threshold engine speed is reached, the recorded sound may no longer be played as there will be a considerable change in engine sound as the engine speed increases to meet the driver torque demand. In one example, in response to a higher than threshold torque demand at the restart, the second modified recorded engine sound may not be generated and played during the restart. Since the engine speed at engine restart is higher than the engine idling speed, playing of the recorded engine sound (or a version of the recorded engine sound) may no longer be required.

In this way, during an engine idle-stop, a first modified version of an engine audio signal may be played during engine spin-down; an un-modified version of the engine audio signal may be played during engine rest following the spin-down; and a second modified version of the engine audio signal may be played during a subsequent engine spin-up from rest.

FIG. 4 shows an example operating sequence 400 illustrating generation of engine sound during an engine idle-stop, rest, and subsequent restart. The horizontal (x-axis) denotes time and the vertical markers t1-t6 identify significant times in generation of the engine sound.

The first plot, line 402, shows a position of the brake pedal. The second plot, line 404, shows variation in engine speed over time as estimated via a crankshaft sensor. A first dashed line 405 shows an engine idling speed immediately prior to engine idle-stop. A second dashed line 407 shows a threshold denoting a warm idling speed. An engine idling speed below the threshold 407 corresponds to cold engine idling. Dotted line 406 shows engine speed during engine restart in response to an accelerator pedal tip-in. The third plot, line 408, shows a waveform of an inherent engine sound during engine operation. Dotted line 409 shows a waveform of an inherent engine sound during engine restart in response to an accelerator pedal tip-in. The fourth plot, line 410, shows a waveform of a generated engine sound during engine idle-stop operation. Dotted line 411 shows a waveform of a generated engine sound during engine restart in response to an accelerator pedal tip-in. The generated engine sound is played via a dashboard speaker. The fifth plot, line 412, shows a waveform of an audible engine sound as perceived by an operator in the vehicle cabin, during engine operation and idle-stop. Dotted line 413 shows a waveform of an audible engine sound during engine restart in response to an accelerator pedal tip-in.

Prior to time t1, the brake pedal is completely disengaged and the engine is operating at an engine speed higher than the idling speed. The engine idling speed is based on current engine operating conditions including engine temperature. The waveform of the inherent engine sound is substantially same as the waveform of the engine sound audible to the operator. At time t1, the operator engages the brake pedal completely and the vehicle comes to a stop. In response to the vehicle coming to a stop, the engine speed reduces to the idling speed. Between time t1 and t2, the engine continues to operate at the idling speed and the inherent engine sound corresponding to the engine idling speed is audible to the operator. The waveform of the inherent engine idling sound is substantially same as the waveform of the engine sound audible to the operator. Based on the higher than threshold 407 engine idling speed, it is inferred that the engine temperature is higher than a threshold and the engine is operating at a warm idling speed. The engine idling sound 430 between time t1 and t2 is recorded via a dashboard microphone and stored in a database as a recorded engine sound.

The engine continues to idle between t1 and t2. In response to the longer than threshold engine idling, at time t2, an engine idle-stop is initiated to improve fuel efficiency and emissions quality. At time t2, engine combustion is suspended and between time t2 and t3, the engine spins down to rest. As the engine spins down, the engine sound changes from the idling sound to an inherent engine spin-down sound. At time t2, the controller models this inherent engine spin-down sound based on the engine idling speed between time t1 and time t2. The modeling takes into account the change in the engine spin-down sound as the engine speed gradually decreases. Between time t2 and t3, a first audio signal 432 may be generated and played via the dashboard speaker. The first generated audio signal 432 may be a first modified version of the engine sound 430 as recorded between time t1 and t2. The first audio signal is produced by first creating an antiphase waveform of the modeled (inherent) engine spin-down sound and then superimposing the antiphase waveform onto the recorded engine sound 430. As the first audio signal 432 is played during the engine spin-down, the inherent engine spin-down sound is at least partially cancelled and a residual sound is produced. This residual sound constitutes the engine sound as audible to the operator in the vehicle cabin. The waveform of the audible engine sound is substantially same as that of the engine sound 430 recorded between time t1 and t2. Therefore, as the inherent engine sound changes from the idling sound to the engine spin down sound, there is no perceivable change in the engine sound audible to the operator.

At time t3, the engine speed may decrease to zero and consequently an inherent engine sound is no longer produced. Between time t3 and t4, the engine is at rest without any engine sound. In order to mask the silence, an unmodified version of the engine sound 430, as recorded between time t1 and t2, may be played in a loop (repeatedly) via the dashboard speakers. The sound audible to the operator may not change appreciably as the waveform of the residual sound playing prior to the time t3 is the same as the waveform of the recorded engine sound 430. At time t3, the phase of the first audio signal (first modified version of recorded sound) is aligned with the phase of the unmodified recorded sound such that there is no perceivable change in the quality of the audible engine sound as the inherent engine sound drops to zero (during engine rest).

At time t4, in response to the brake pedal being disengaged, the engine is restarted. Based on the torque demand, the target engine speed after the restart is same as the engine idling speed prior to engine spin-down such that there is no difference in the inherent engine idling sound before the idle-stop and after the subsequent engine restart. At time t4, engine combustion is resumed and between time t4 and t5, the engine spins up, increasing the engine speed to the target idling speed 405. As the engine spins-up, the engine sound changes from the inherent engine spin-up sound to the inherent engine idling sound. At time t4, the controller models this inherent engine spin-up sound based on the target engine idling speed 405. The modeling takes into account the change in the engine spin-up sound as the engine speed gradually increases. Between time t4 and t5, a second audio signal 434 may be generated and played via the dashboard speaker. The second generated audio signal 434 may be a second modified version of the engine sound 430 as recorded between time t1 and t2. The second audio signal is produced by creating an antiphase waveform of the modeled (inherent) engine spin-up sound and then superimposing the antiphase waveform onto the recorded engine sound. As the second audio signal is played during the engine spin-up, the inherent engine spin-up sound is at least partially cancelled and over and above that, a residual sound is produced. This residual sound constitutes audible engine sound as perceived by an operator in the vehicle cabin. Between time t4 and t5, the phase of the residual sound is aligned to the phase of the inherent engine sound. The waveform of the audible engine sound is substantially same as that of the engine sound recorded between time t1 and t2. Therefore, as the inherent engine sound changes from zero to the engine spin-up sound, there is no perceivable change in the engine sound audible to the operator and the operator continues to hear the engine idling sound throughout the engine idle-stop and subsequent restart.

At time t5, the engine spin-up is complete and the engine speed increases to the idling speed 405. Once the engine speed reaches the idling speed, the inherent engine sound may be substantially same as the engine idling sound prior to engine idle-stop (as recorded between time t1 and t2). As cancellation of the inherent engine spin-up sound is complete, the generated engine sound may be gradually phased out. The amplitude of the waveform of the (unmodified) engine sound as recorded between time t1 and t2 may be progressively decreased as the generated engine sound is phased out. Once a threshold duration has elapsed since the engine idling speed is reached, at time t6, the playing of the recorded engine sound may be suspended. By aligning the phase of the inherent engine sound with that of the residual sound during the engine spin-up and then by gradually phasing out the generated sound, the engine sound audible to the operator may be maintained without any substantial (perceivable) change in volume or sound quality. After time t6, the inherent engine sound may be the sound audible to the operator and no additional sound is being played.

Alternatively, if at time t4, the engine is restarted in response to an accelerator pedal tip-in, the engine speed may increase to above the engine idling speed prior to engine idle-stop, as shown by dotted line 406. During such tip-in conditions, an audio signal may be generated and played via the dashboard speaker until the engine speed reaches the idling speed 405. Once the engine speed reaches the idling speed 405, the generated sound is no longer played. The generated audio signal, as shown by dotted line 411, is another modified version of the engine sound as recorded between time t1 and t2. As the engine speed increases above the engine idling speed, the amplitude of the inherent engine sound increases and there is a significant change (an increase in volume) in the engine sound audible to the operator. Due to increased volume of the audible engine sound after a tip-in, gradual phasing out of the generated sound no longer makes a difference to the perceived engine sound and therefore, the generated engine sound is suspended without any further modification to the amplitude.

In this way, by playing suitably modified versions of a recorded engine audio signal during an engine idle-stop, subsequent engine rest, and restart, any change in engine sound may not be perceived by the operator. By cancelling inherent engine down-down and engine spin-up sounds and generating a residual sound, the engine idling sound may be seamlessly maintained during the engine start-stop operation. The technical effect of phasing out the engine audio signal upon the engine speed reaching the target idling speed following the engine spin-up is that any abrupt change in engine sound due to suspension of engine audio signal playback may be reduced. By recording engine audio signals using a dashboard microphone, and by playing back the suitably modified recording during engine idle-stop via a dashboard speaker, there may not be any difference in the quality of engine sound as audible to the vehicle operator. In this way, the overall perception of change in engine sound during frequent idle-stops may be reduced.

An example method comprises: during an idle-stop, generating, through an electronic speaker, an engine sound responsive to an automatic engine stop during each of an engine spin-down and while the engine is subsequently at rest, including commencing at least partial active engine noise cancellation upon the spin-down and ending said cancellation upon reaching stabilized idle in a restart. In any preceding example, additionally or optionally, the engine sounds includes an engine idling sound. In any or all of the preceding examples, additionally or optionally, the restart is to the same idle speed as before the automatic engine stop. In any or all of the preceding examples, additionally or optionally, the generated engine sound is based on a measured engine speed immediately prior to the automatic engine stop. Any or all of the preceding examples further comprising, additionally or optionally, adjusting at least a phase of the generated engine sound during the restart to phase align a resulting sound with inherent engine sound and then phasing out said generated sound. In any or all of the preceding examples, additionally or optionally, adjusting at least the phase includes adjusting the phase and an amplitude of the generated engine sound during the restart based on engine speed to phase align the resulting sound with inherent engine sound during the restart. In any or all of the preceding examples, additionally or optionally, the phasing out the said generated sound includes reducing the amplitude of the generated engine sound during the restart while maintaining the adjusted phase and responsive to a lower than threshold amplitude, discontinuing the generated sound, the threshold amplitude based on an inherent engine speed after restart. In any or all of the preceding examples, additionally or optionally, the at least partial active engine noise cancellation upon the spin-down includes modifying the amplitude and the phase of the generated engine sound to at least partially cancel an inherent engine spin-down sound and produce a residual sound matching the measured engine sound immediately prior to the shutdown request. Any or all of the preceding examples further comprising, additionally or optionally, in response to a higher than threshold torque demand at the restart, not generating the engine sound during the restart.

Another example method comprises: during an engine idle-stop, playing a first modified version of an engine audio signal during engine spin-down, playing an un-modified version of the engine audio signal during engine rest following the spin-down, and playing a second modified version of the engine audio signal during a subsequent engine spin-up from rest. Any preceding example further comprising, additionally or optionally, recording an engine idling sound immediately prior to suspension of engine combustion via a dashboard microphone and producing the engine audio signal by filtering the engine idling sound to remove peripheral noise, wherein the engine idling sound is recorded during one or more of engine idling speed lower than a threshold speed and ambient temperature higher than a threshold temperature. Any or all of the preceding examples further comprising, additionally or optionally, during a higher than threshold engine idling speed, retrieving a baseline audio signal from a database and modifying the baseline audio signal based on engine operating conditions including the ambient temperature and the engine idling speed to produce the engine audio signal. Any or all of the preceding examples further comprising, additionally or optionally, during the engine spin-down, modeling an inherent engine spin-down sound based on an engine speed sensed immediately prior to suspension of combustion, the inherent engine spin-down sound including a first waveform having a first phase and a first amplitude. In any or all of the preceding examples, additionally or optionally, the audio signal includes a second waveform having a second phase and a second amplitude, and wherein playing the first modified version of the audio signal includes: producing a first antiphase waveform having the first amplitude and a phase opposite to the first phase of the inherent engine spin-down sound, adding the first antiphase waveform to the second waveform of the audio signal to generate the first modified version of the audio signal, and playing the first modified version via a dashboard speaker. Any or all of the preceding examples further comprising, additionally or optionally, during the subsequent engine spin-up, modeling an inherent engine spin-up sound based on a target engine restart speed, the inherent engine spin-up sound including a third waveform having a third phase and a third amplitude, the target engine restart speed is the engine idling speed immediately prior to suspension of combustion. In any or all of the preceding examples, additionally or optionally, playing the second modified version of the audio signal includes: producing a second antiphase waveform having the third amplitude and phase opposite to the third phase of the inherent engine spin-up sound, adding the second antiphase waveform to the second waveform of the audio signal to generate the second modified version of the audio signal, and playing the second modified version via the dashboard speaker. Any or all of the preceding examples further comprising, additionally or optionally, in response to engine speed reaching the target engine restart speed, playing a third modified version of the audio signal, wherein playing the third modified version includes adjusting the second waveform of the audio signal to phase align with an inherent engine sound and then phasing out the third modified version of the audio signal after a threshold duration.

In yet another example, a vehicle system comprises: a vehicle, a dashboard including a speaker and a microphone, an engine including a crankshaft sensor and an engine coolant temperature sensor, a controller with computer readable instructions stored on non-transitory memory for: recording engine sounds during engine combustion including during engine idling via the speaker, storing the recordings in a database, and responsive to idle-stop conditions, spinning down the engine, selecting a sound from the recorded engine sounds based on an engine idling speed immediately prior to engine spin-down, and playing a first modified version of the selected sound to cancel an inherent engine spin-down sound and generate a residual sound, via the speaker, wherein the residual sound and the selected sound have a common waveform. In any preceding example, additionally or optionally, the controller contains further instructions for: during engine rest following the engine spin-down, playing an unmodified version of the selected sound via the speaker. In any or all of the preceding examples, additionally or optionally, the controller contains further instructions for: responsive to idle-start conditions following an idle-stop, spinning up the engine, playing a second modified version of the selected sound to cancel an inherent engine spin-up sound and generate the residual sound, via the speaker, responsive to engine speed reaching an idling speed, synchronizing the second modified version of the selected sound with an inherent engine idling sound and then phasing out the second modified version of the selected sound, and updating the database with each of the first modified version of the selected sound and the second modified version of the selected sound.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:
1. A method, comprising:
during an idle-stop,
generating, through an electronic speaker, an engine sound responsive to an automatic engine stop during each of an engine spin-down and while the engine is subsequently at rest, including commencing at least partial active engine noise cancellation upon the spin-down and ending said cancellation upon reaching stabilized idle in a restart, and
adjusting at least a phase of the generated engine sound during the restart to phase align a resulting sound with inherent engine sound and then phasing out said generated sound.

2. The method of claim 1, wherein the engine sound includes an engine idling sound.

3. The method of claim 1, wherein the restart is to a same idle speed as before the automatic engine stop.

4. The method of claim 1, wherein the generated engine sound is based on a measured engine speed immediately prior to the automatic engine stop.

5. The method of claim 1, wherein adjusting at least the phase includes adjusting the phase and an amplitude of the generated engine sound during the restart based on engine speed to phase align the resulting sound with inherent engine sound during the restart.

6. The method of claim 5, wherein the phasing out the said generated sound includes reducing the amplitude of the generated engine sound during the restart while maintaining the adjusted phase and responsive to a lower than threshold amplitude, discontinuing the generated sound, the threshold amplitude based on an inherent engine speed after restart.

7. The method of claim 5, wherein the at least partial active engine noise cancellation upon the spin-down includes modifying the amplitude and the phase of the generated engine sound to at least partially cancel an inherent engine spin-down sound and produce a residual sound matching a measured engine sound immediately prior to a shutdown request.

8. The method of claim 1, further comprising, in response to a higher than threshold torque demand at the restart, not generating the engine sound during the restart.

9. A method, comprising:
   during an engine idle-stop,
      playing a first modified version of an engine audio signal during engine spin-down;
      playing an un-modified version of the engine audio signal during engine rest following the spin-down;
      playing a second modified version of the engine audio signal during a subsequent engine spin-up from rest; and
      recording an engine idling sound immediately prior to suspension of engine combustion via a dashboard microphone and producing the engine audio signal by filtering the engine idling sound to remove peripheral noise, wherein the engine idling sound is recorded during one or more of engine idling speed lower than a threshold speed and ambient temperature higher than a threshold temperature.

10. The method of claim 9, further comprising, during a higher than threshold engine idling speed, retrieving a baseline audio signal from a database and modifying the baseline audio signal based on engine operating conditions, including the ambient temperature and the engine idling speed, to produce the engine audio signal.

11. The method of claim 9, further comprising, during the engine spin-down, modeling an inherent engine spin-down sound based on an engine speed sensed immediately prior to suspension of combustion, the inherent engine spin-down sound including a first waveform having a first phase and a first amplitude.

12. The method of claim 11, wherein the audio signal includes a second waveform having a second phase and a second amplitude, and wherein playing the first modified version of the audio signal includes:
   producing a first antiphase waveform having the first amplitude and a phase opposite to the first phase of the inherent engine spin-down sound;
   adding the first antiphase waveform to the second waveform of the audio signal to generate the first modified version of the audio signal; and
   playing the first modified version via a dashboard speaker.

13. The method of claim 11, further comprising, during the subsequent engine spin-up, modeling an inherent engine spin-up sound based on a target engine restart speed, the inherent engine spin-up sound including a third waveform having a third phase and a third amplitude, wherein the target engine restart speed is an engine idling speed immediately prior to suspension of combustion.

14. The method of claim 13, wherein playing the second modified version of the audio signal includes:
   producing a second antiphase waveform having the third amplitude and a phase opposite to the third phase of the inherent engine spin-up sound;
   adding the second antiphase waveform to a second waveform of the audio signal to generate the second modified version of the audio signal; and
   playing the second modified version via a dashboard speaker.

15. The method of claim 13, further comprising, in response to engine speed reaching the target engine restart speed, playing a third modified version of the audio signal, wherein playing the third modified version includes adjusting a second waveform of the audio signal to phase align with an inherent engine sound and then phasing out the third modified version of the audio signal after a threshold duration.

16. A vehicle system, comprising:
   a vehicle;
   a dashboard including a speaker and a microphone;
   an engine including a crankshaft sensor and an engine coolant temperature sensor; and
   a controller with computer readable instructions stored on non-transitory memory for:
      recording engine sounds during engine combustion including during engine idling via the speaker;
      storing the recordings in a database; and
      responsive to idle-stop conditions,
         spinning down the engine;
         selecting a sound from the recorded engine sounds based on an engine idling speed immediately prior to engine spin-down; and
         playing a first modified version of the selected sound to cancel an inherent engine spin-down sound and generate a residual sound, via the speaker, wherein the residual sound and the selected sound have a common waveform,
   wherein the controller contains further instructions for:
      responsive to idle-start conditions following an idle-stop,
         spinning up the engine,
         playing a second modified version of the selected sound to cancel an inherent engine spin-up sound and generate the residual sound, via the speaker;
         responsive to engine speed reaching an idling speed, synchronizing the second modified version of the selected sound with an inherent engine idling sound and then phasing out the second modified version of the selected sound; and
         updating the database with each of the first modified version of the selected sound and the second modified version of the selected sound.

17. The system of claim 16, wherein the controller contains further instructions for, during an engine rest following the engine spin-down, playing an unmodified version of the selected sound via the speaker.

18. A method, comprising:
   during an idle-stop, generating, through an electronic speaker, an engine sound responsive to an automatic engine stop during each of an engine spin-down and a subsequent engine rest, including commencing at least partial active engine noise cancellation upon the spin-down, ending said cancellation upon reaching stabilized idle in a restart, and in response to a higher than threshold torque demand at the restart, not generating the engine sound during the restart.

* * * * *